United States Patent Office 2,781,163
Patented Feb. 12, 1957

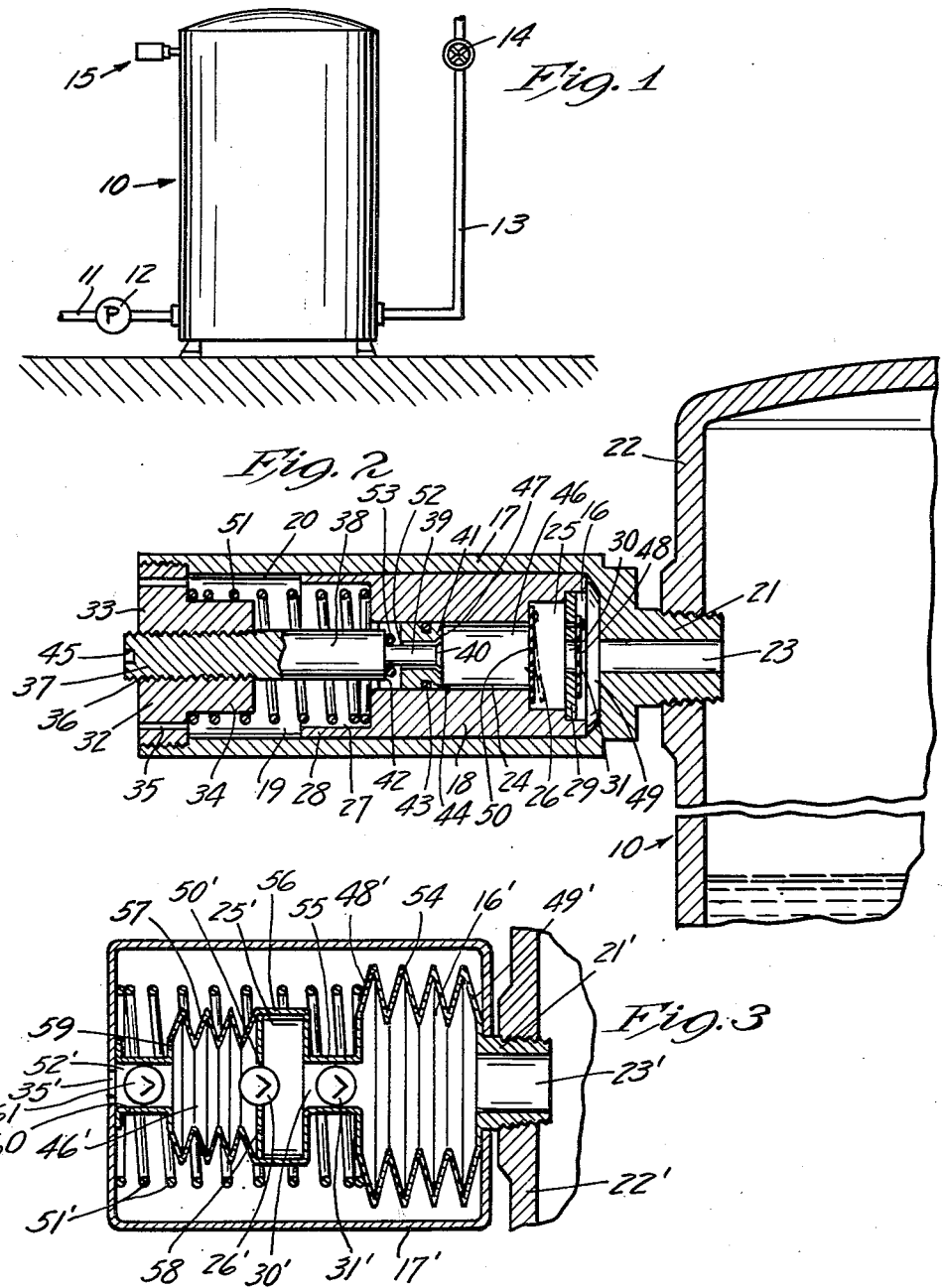

2,781,163

FLUID-PRESSURE-OPERATED FLUID INJECTOR

Harry J. Sadler and Ernest E. Cook, Minneapolis, Minn.

Application December 1, 1954, Serial No. 472,438

3 Claims. (Cl. 230—52)

Our invention relates to improvements in a fluid-pressure-operated fluid injector; and in particular, it relates to a fluid-pressure-operated fluid injector for maintaining a predetermined air volume under a given pressure at the top of a supply tank of a water supply system by controllably replenishing the air within said supply tank.

The present invention represents an improvement over the invention disclosed and claimed in our copending application for a "Fluid-Pressure-Operated Fluid Injector" filed at the same time as the instant application. The afore-mentioned copending application is adapted to replenish a determinable quantity of air at the top of the water supply tank during the pumping period of the operating cycle of the water supply system, and generally at a point of high pressure within the supply tank. It is the primary object of the instant invention to provide an improved fluid injector which is simply and effectively operative to inject a controlled quantity of air into the supply tank of a water supply system at a low pressure point within the supply tank of the cycle of operation of the water supply system.

It is another object of the instant invention to provide a fluid injector comprising primary and secondary expandable and contractible pressure chambers variable by the pressure variations within the supply tank, wherein the expansion of the primary chamber, motivated by the increase of pressure within the supply tank from its predetermined minimum value to its predetermined maximum value, contracts a volume of air trapped within the secondary chamber to a pressure greater than the pressure within a buffer chamber. This volume of air is then ejected from the secondary chamber to the buffer chamber where it is stored until the pressure within the supply tank drops from its predetermined maximum pressure to a pressure near the predetermined minimum pressure, at which point it is ejected into the supply tank.

These and other objects will be disclosed in the course of the following specification and claims, reference being had to the accompanying drawings wherein:

Fig. 1 is a view in side elevation showing our invention attached to the supply tank of a domestic water supply system;

Fig. 2 is an enlarged fragmentary view in vertical section showing in detail one modification of our invention at one operative position thereof; and Fig. 3 is an enlarged section view of a second modification of our invention showing the check valves thereof indicated symbolically.

Referring in particular to Fig. 1, reference numeral 10 indicates a supply tank of the ordinary domestic water supply system. The numeral 11 indicates a pipe from the tank 10 to a source of water, from which water is pumped to the supply tank 10 by a pump 12, indicated symbolically. Water is withdrawn from the supply tank 10 through an outlet pipe 13 having a manual cutoff valve 14 interposed therein. Pump 12 is adapted to be controlled by means, not shown in the drawings, whereby it is operative between predetermined minimum and maximum pressures within the supply tank 10. Generally in the usual household water supply system, the pump 12 will operate to fill the supply tank 10 until the pressure therein is approximately 40 pounds per square inch, at which point the pump 12 will cease to operate; as water is withdrawn, the pressure within the tank will drop to the predetermined minimum pressure, usually 20 pounds per square inch, at which point the pump 12 will again become operative to fill the supply tank 10 to the maximum predetermined pressure therein of approximately 40 pounds per square inch. Our novel and improved fluid-pressure-operated fluid injector is indicated by the general reference numeral 15 and is attached to the supply tank 10 to be operated by the pressure variations therein.

Referring in particular to the modification shown in Fig. 2, fluid injector 15 has structure defining a primary expandable and contractible pressure chamber 16 which is defined by a tubular casing 17 and a piston-acting member 18. Chamber 16 is a portion of a space 19 within the casing 17; and the remaining portion of space 19 is indicated by the numeral 20.

Casing 17 has a reduced nozzle-shaped end 21 which is threaded to adapt it to be screwed into the side wall 22 of the supply tank 10. Preferably, end 21 is screwed into the side wall 22 above the maximum level of the water therein; however, valve 15 will be operative, as subsequently described, in substantially the same manner if end 21 is screwed into the side wall 22 below the maximum water level within tank 10. Extending longitudinally through end 21 of casing 17 is a central cylindrical bore 23 which communicates pressure chamber 16 with the interior of the supply tank 10.

Member 18 is mounted in space 20 within casing 17 for longitudinal movement in opposite directions responsive to the variations of pressure within the supply tank 10, transmitted through bore 23 to the primary chamber 16. Member 18 has two intercommunicated internal cylindrical cavities 24 and 25. The cavity 24 comprises a cylindrical bore closed at one end by a flap valve 26 and extending therefrom through an enlarged bore portion 27 and through end 28 of member 18 to open into space 20.

Cavity 25 comprises a buffer chamber having one end wall partially defined by flap valve 26 and an opposite end wall defined by a partition 29 secured to the member 18. Partition 29 has an aperture 30 which defines a passage from buffer chamber 25 to primary chamber 16. Buffer chamber 25 is in communication with supply tank 10 through passage 30, primary chamber 16 and bore 23. A flap valve 31 acts as a check valve allowing communication through passage 30 only in the direction of the primary chamber 16.

Opposite end 21, casing 17 is adapted to receive an enlarged threaded end 32 of a cap member 33 which has a reduced cylindrical portion 34 extending into space 20 in coaxial alignment with bore 24 and enlarged bore portion 27. Cap member 33 has apertures 35 extending through the enlarged end 32 to communicate space 20 with a source of fluid, air outside the supply tank 10 at atmospheric pressure, and has a tapped central bore 36 adapted to receive threaded end 37 of an adjustable plunger 38. Plunger 38 is in coaxial alignment with bore 24 and has a reduced end portion 39 terminating in a beveled flange 40. An enlarged piston portion 41 of plunger 38 is loosely carried on end portion 39 for limited relative longitudinal movement between flange 40 and a shoulder 42 adjacent the commencement of reduced end portion 39. Piston portion 41 is provided with a channel 43 intermediate its ends in which is positioned an O-ring 44; and piston portion 41 is fitted within bore 24 for relative longitudinal movement in opposite directions. Threaded end 37 of plunger 38 is provided with a notch 45 in which may be inserted a screwdriver to move plunger 38 longitudinally in opposite directions in the cap member 33. This longitudinal adjustment of plunger 38 determines its stroke within cylindrical bore 24 for a purpose subsequently described.

Piston portion 41 and bore 24 define a secondary expandable and contractible pressure chamber indicated by the numeral 46. An end face 47 together with flange 40 and flap valve 26 define relatively movable opposite end wall portions of the secondary chamber 46; wherein, flap valve 26 carried by the member 18 is movable toward and away from end face 47 which is relatively fixed. A relatively movable end wall of the primary chamber 16 is defined by flap valve 31, partition 29 and a portion of member 18 and is indicated in its entirety by the numeral 48. End wall 48 is relatively movable toward and away from an inner surface 49 of the casing 17, which defines an opposite end wall of the chamber 16.

Flap valve 26 acts as a check valve to allow flow from the secondary chamber 46 to the buffer chamber 25 only in the direction of the latter through an opening 50 which may be considered a passage between bore 24 and buffer chamber 25. Yielding means 51 biases member 18 in a direction to contract the primary chamber 16 and expand the secondary chamber 46, and preferably, as shown, comprises a spiral spring extending from the shoulder between the enlarged end 32 and the reduced portion 34 of cap member 33 to the shoulder between bore 24 and enlarged bore portion 27. Yielding means 51 is adapted to bias member 18 to the maximum contracted position of primary chamber 16, shown in Fig. 2, at the minimum predetermined pressure within the tank 10. When primary chamber 16 is at its maximum contracted position, secondary chamber 46 is at its maximum expanded position and at this position is adapted to be in communication with the air outside the supply tank 10 at atmospheric pressure through a passage controlled by valve means associated therewith, which valve means are adapted to be opened at the minimum predetermined pressure within supply tank 10 and closed during the increase of pressure within supply tank 10 from its predetermined minimum value to its predetermined maximum value so as to periodically trap a quantity of air from atmosphere in the secondary chamber 46. The afore-mentioned passage and valve means might be formed in many ways; however, preferably as shown, the passage between chamber 46 and atmosphere comprises a space 52 between the reduced end 39 and piston portion 41 of plunger 38. As shown in Fig. 2 this communicates secondary chamber 46 with atmosphere through bore portion 27, space 20 and apertures 35 in the cap member 33. The valve means associated with the space or passage 52 as shown comprises O-ring 53, mounted on reduced end 39 adjacent shoulder 42, and piston portion 41 which is movable on end portion 39 to seat against O-ring 53 when member 18 moves from the position shown in Fig. 2 upon an increase of pressure within the supply tank 10.

The operation of our invention is as follows:

At the minimum predetermined pressure within the supply tank 10 the parts of our fluid injector 15 are as shown in Fig. 2. Upon the increase of pressure within the supply tank 10 from its predetermined minimum value to its predetermined maximum value, member 18 is moved against the bias of yielding means 51 and the pressure within the secondary chamber 46 by the distribution of the pressure within the supply tank over movable end wall 48 of primary chamber 16. Member 18 is moved in a direction to expand primary chamber 16 and contract secondary chamber 46. At the initial movement of member 18 the valve means associated with passage or space 52 is closed by the movement of plunger portion 41 against the O-ring 53. Further movement of member 18 increases the pressure of the fluid trapped in secondary chamber 46 until the pressure therein is sufficient to open flap valve 26, which is indicated in open position in dotted lines in Fig. 2; and the air trapped within the secondary chamber 46 is ejected into the buffer chamber 25. The increase of pressure within supply tank 10 to its predetermined maximum value will completely evacuate secondary chamber 46 into the buffer chamber 25. The amount of air so ejected is determined by the maximum expanded position of the secondary chamber 46 which is controlled by the longitudinal adjustment of plunger 38, which adjusts the stroke of plunger portion 41 within bore 24. The maximum contracted position of the secondary chamber 46, which will also be the maximum expanded position of primary chamber 16, is maintained until the pressure within supply tank 10 is decreased from its predetermined maximum by the withdrawal of water from the supply tank 10 through pipe 13. Member 18 during the decrease of pressure within supply tank 10 is moved by the bias of yielding means 51 back to the position shown in Fig. 2 at the minimum predetermined pressure within the supply tank 10.

The evacuation of the air of secondary chamber 46 into buffer chamber 25 has increased the pressure of the air within buffer chamber 25; and this increase of pressure is sufficient to open the flap valve 31, shown in open position in dotted lines in Fig. 2, when the pressure within supply tank 10 approaches its minimum predetermined value. The opening of flap valve 31 results in an equalization of pressure between buffer chamber 25 and supply tank 10 which causes a volume of air to pass through passage 30 and bore 23 into the supply tank 10. Essentially, this volume of air is equivalent to the volume of air ejected into the buffer chamber 25 from the secondary chamber 46; and as previously explained, is controllable by the adjustment of plunger 38. Thus, it is clear that, during an operating cycle of the water supply system, the supply tank 10 will receive an amount of air from atmosphere which may be adjusted to equal the quantity of air absorbed in the water in the supply tank 10 during each cycle of operation.

Referring to the modification shown in Fig. 3, it demonstrates the principle of our invention whereby the structure defining the primary and secondary expandable and contractible chambers instead of comprising piston and cylinder, as in the modification shown in Fig. 2, are formed by bellows. As many of the elements of the modification shown in Fig. 3 are the same as or equivalent to the modification shown in Fig. 2, they will be indicated by the same numeral, but to avoid any confusion will be distinguished by a prime mark.

The primary expandable and contractible chamber 16' is defined by a bellows 54 having a fixed end wall 49' secured to a reduced end portion 21' of a casing 17'. Reduced end portion 21' of casing 17' is adapted to be screwed into the side wall 22' of the supply tank 10, and has a central bore 23' which communicates primary chamber 16' with the supply tank 10. Bellows 54 has a movable end wall 48' secured to a tubular member 55 defining a passage 30' which communicates primary chamber 16' with a buffer chamber 25'. A check valve 31' allows flow through passage 30' only in the direction of the primary chamber 16'. Buffer chamber 25' is formed by a cylindrical member 56 secured to or formed integrally with tubular member 55. Member 56 is also secured to a bellows 57, which defines a secondary expandable and contractible chamber 46'. A partition 58 separates secondary chamber 46' from buffer chamber 25'; but they are in communication through an opening or passage 50' in the partition 58. A check valve 26', indicated symbolically, is associated with passage 50', and allows flow therethrough only in the direction of buffer chamber 25'. Partition 58 defines an end wall of the secondary chamber 46' movable toward and away from an opposite end wall 59, which in the modification shown in Fig. 2 is defined by face 49 and flange 43. End wall 59 is relatively fixed to the casing 17' by a flanged tubular member 60 which forms a passage 52'.

Passage 52' and an aperture 35' in the casing 17' communicates secondary chamber 46' with the air at atmospheric pressure outside the supply tank 10. A check valve 61, equivalent to the valve means consisting of O-ring 53 and movable piston portion 41 in the modification shown in Fig. 2, is associated with passage 52' and allows flow therethrough only in the direction of secondary chamber 46'. Yielding means 51' extending between casing 17' and bellows 54 biases the movable end walls 48' and 58 of the primary chamber 16' and secondary chamber 46', respectively, in a direction tending to contract the primary chamber 16' and expand the secondary chamber 46'. The primary chamber 16' is biased to a maximum contracted position at the minimum predetermined pressure within supply tank 10.

The operation of the modification of our invention illustrated in Fig. 3 is essentially the same as the operation of the modification shown in Fig. 2, and it is believed that the explanation of the operation of the modification of Fig. 2 is adequate by analogy to describe the operation of Fig. 3.

It will be obvious to those skilled in the art that our invention may be modified by many substitutions and equivalents and that this disclosure is intended to be illustrative only. Therefore, we intend to be limited solely by the scope of the appended claims.

What we claim is:

1. A fluid-pressure-operated fluid injector adapted for connection to the supply tank of a water supply system, the pressure within said tank being variable between predetermined maximum and minimum values, comprising structure defining a primary expandable and contractible pressure chamber adapted for connection to said supply tank, structure defining a secondary expandable and contractible pressure chamber, said expandable and contractible chambers having relatively movable opposite end wall portions, one end wall of each of said chambers being relatively fixed and the other end wall of each thereof being connected for movement in common toward and away from said fixed walls of the chambers, yielding means urging the associated movable end walls of said expandable and contractible chambers in a direction tending to contract the primary chamber and expand the secondary chamber, structure defining a buffer chamber, means defining a check valve equipped passage connecting said secondary chamber and said buffer chamber allowing communication between said secondary chamber and said buffer chamber only in the direction of the latter, means defining a check valve equipped passage adapted to connect said buffer chamber and said supply tank allowing communication between said buffer chamber and the supply tank only in the direction of the latter, means defining a passage from said secondary chamber to the air outside the supply tank which is at atmospheric pressure, and valve means for controlling the flow of air through said last-mentioned passage which valve means is adapted to be open at the minimum predetermined pressure within said supply tank and closed during the increase of pressure within said supply tank from its predetermined minimum value to its predetermined maximum value.

2. The structure defined in claim 1, wherein said buffer chamber comprises a chamber of fixed volume positioned between the associated movable end walls of said expandable and contractible chambers, and the passage adapted to connect said buffer chamber and said supply tank extends between said buffer chamber and said primary chamber and communicates said buffer chamber with said supply tank through said primary chamber.

3. A fluid-pressure-operated fluid injector adapted for connection to the supply tank of a water supply system, the pressure within said tank being variable between predetermined maximum and minimum values, comprising a casing adapted for connection to said supply tank, a piston-acting member positioned within said casing for longitudinal movement in opposite directions responsive to variations of pressure within said supply tank and defining with said casing a primary expandable and contractible pressure chamber, said member having two intercommunicated internal cylindrical cavities, one of said cavities comprising a cylindrical bore longitudinally extending through the end of said member farthest from said primary chamber, a plunger connected to said casing and positioned in coaxial alignment with said bore for relative longitudinal movement in opposite directions therein and defining therewith a secondary expandable and contractible chamber, the other of said cavities comprising a buffer chamber positioned between said secondary chamber and said primary chamber, a check valve between said cavities for allowing communication therebetween only in the direction of said buffer chamber, means defining a check valve equipped passage between said buffer chamber and said primary chamber allowing communication between said buffer chamber and said primary chamber only in the direction of the latter, yielding means biasing said member in a direction tending to contract the primary chamber and expand the secondary chamber, means defining a passage between said bore and the air outside the supply tank which is at atmospheric pressure, and valve means for controlling the flow of air through said last-mentioned passage which valve means is adapted to be open at the minimum predetermined pressure within said supply tank and closed during the increase of pressure within said supply tank from its predetermined minimum value to its predetermined maximum value.

References Cited in the file of this patent

UNITED STATES PATENTS

| | | |
|---|---|---|
| 1,717,619 | Neilsen et al. | June 18, 1929 |
| 2,486,617 | Soberg | Nov. 1, 1949 |
| 2,652,973 | Dibble et al. | Sept. 22, 1953 |